(12) United States Patent
Kribernegg et al.

(10) Patent No.: US 11,208,166 B2
(45) Date of Patent: Dec. 28, 2021

(54) DEVICE FOR POSITIONING VEHICLE PARTS

(71) Applicant: MAGNA STEYR Fahrzeugtechnik AG & Co KG, Graz (AT)

(72) Inventors: Christoph Kribernegg, Leibnitz (AT); Patrick Leonhardsberger, Graz (AT); Thomas Mayer, Frannach (AT); Manfred Pichler, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 16/932,106

(22) Filed: Jul. 17, 2020

(65) Prior Publication Data
US 2021/0024152 A1    Jan. 28, 2021

(30) Foreign Application Priority Data
Jul. 25, 2019 (EP) .................................... 19188407

(51) Int. Cl.
| | |
|---|---|
| *B62D 65/02* | (2006.01) |
| *B23P 19/04* | (2006.01) |
| *B25B 11/00* | (2006.01) |
| *B25B 1/24* | (2006.01) |
| *B23Q 1/00* | (2006.01) |

(52) U.S. Cl.
CPC ............ *B62D 65/026* (2013.01); *B23P 19/04* (2013.01); *B23Q 1/0072* (2013.01); *B25B 1/2405* (2013.01); *B25B 11/00* (2013.01)

(58) Field of Classification Search
CPC ..... B62D 65/026; B62D 65/022; B25B 11/00; B25B 1/2405; B23P 19/04; B23P 2700/50; B23P 21/00; B23K 2101/006; B23K 2101/18; B23K 31/02; B23K 37/047; B23K 37/0443
See application file for complete search history.

(56) References Cited

U.S. PATENT DOCUMENTS 1,354,991 A * 10/1920 Minor ....................... B25B 1/22
269/84
9,902,033 B1 * 2/2018 Taylor ....................... B25B 1/24
(Continued)

FOREIGN PATENT DOCUMENTS

| CN | 202010003829 U1 | 7/2010 |
|---|---|---|
| CN | 205184073 U | 4/2016 |

(Continued)

OTHER PUBLICATIONS

European Search Report for European Patent Application No. 19188407.1, dated Jan. 17, 2020, 5 pages.

*Primary Examiner* — Mahdi H Nejad
(74) *Attorney, Agent, or Firm* — Jordan IP Law, LLC; Todd A. Vaughn

(57) ABSTRACT

A device for positioning motor vehicle parts in the production or manufacture of motor vehicles. The device includes a main frame, at least one main module configured to be disposed on the main frame, at least one interchangeable first docking plate configured for releasable connection to the main module, and a plurality of first receptacles, arranged on the interchangeable first docking plate, configured to hold the motor vehicle parts at a predefined position during the production.

10 Claims, 3 Drawing Sheets

(56) References Cited

U.S. PATENT DOCUMENTS

| | | | |
|---|---|---|---|
| 2004/0256780 A1* | 12/2004 | Lang | B23Q 16/00 269/309 |
| 2009/0075796 A1* | 3/2009 | Doll | B25J 15/0491 483/59 |
| 2018/0057278 A1* | 3/2018 | Kunihiro | B23Q 7/1494 |
| 2018/0273243 A1 | 9/2018 | Kilibarda et al. | |

FOREIGN PATENT DOCUMENTS

| CN | 104148860 A | 8/2016 |
|---|---|---|
| CN | 105882789 A | 8/2016 |
| CN | 107263133 A | 10/2017 |
| DE | 19820094 A1 | 11/1999 |
| DE | 202016101411 U1 | 6/2017 |
| DE | 202017102155 U1 | 7/2018 |
| JP | H05277848 A | 10/1993 |

\* cited by examiner

DEVICE FOR POSITIONING VEHICLE PARTS

CROSS-REFERENCE TO RELATED APPLICATIONS

The present application claims priority under 35 U.S.C. § 119 to European Patent Publication No. EP 19188407.1 (filed on Jul. 25, 2019), which is hereby incorporated by reference in its complete entirety.

TECHNICAL FIELD

Embodiments relates to a device for positioning motor vehicle parts for producing motor vehicles, and to a method for selectively configuring such a device for positioning motor vehicle parts for producing motor vehicles of a first type of motor vehicle and for producing motor vehicles of a second type of motor vehicle.

BACKGROUND

The automated production of motor vehicles nowadays is well known. Body parts and/or chassis parts, in particular, are usually equipped with further add-on parts or assembled so as to form larger vehicle modules at various workstations along a production line. It is increasingly necessary herein to be able to produce dissimilar types of motor vehicles in the same workstations at an ideally minor temporal interval. A conversion of the workstation is usually required for producing dissimilar types of motor vehicles. Since the parts of dissimilar types of motor vehicles in most instances have dissimilar geometries, positioning and holding devices for the motor vehicle parts have to be converted or replaced, for example.

For example, German Patent Publication No. DE 198 20 094 A1 discloses a system for positioning and welding body parts of dissimilar types of motor vehicles, having an assembly jig which is guided on a conveyor track and which has receptacles for at least some body parts with positioning installations for the body parts and with one or more robot which is configured to be used for welding tasks, wherein the assembly jig has positioning installations for at least some body parts and externally activatable clamping installations for the body parts, wherein a further conveying track on which one of a plurality of auxiliary assembly jigs is in each case guided, is disposed beneath the conveying track, wherein parking positions for the auxiliary assembly jigs are provided beside the lower conveyor track, wherein the auxiliary assembly jigs have in each case receptacles for further body parts of dissimilar types of motor vehicles as well as installations for positioning and bracing in relation to the assembly jig, and wherein a lifting device for the auxiliary assembly jig is provided.

SUMMARY

Embodiments relate to a device for positioning motor vehicle parts for producing motor vehicles, said device permitting simple and rapid conversion to various type of vehicles, and a method for selectively configuring such a device for positioning motor vehicle parts for producing motor vehicles of a first type of motor vehicle and for producing motor vehicles of a second type of motor vehicle.

In accordance with embodiments, a device for positioning motor vehicle parts for producing motor vehicles may comprise a main frame; one or more main module disposed on the main frame; receptacles configured to hold the motor vehicle parts; one or more interchangeable docking plate configured to being fixed to the main module and upon which the receptacles are thereon.

In accordance with embodiments, the holding of motor vehicle parts for further processing is performed via receptacles which are usually adapted precisely to the motor vehicle parts to be received, and thus, are configured to depend on the motor vehicle type. However, such receptacles are not connected directly to, for example, a frame of a workstation or a device, respectively, but rather connected to an interchangeable docking plate. Thus, a substantially plate-shaped element which is configured to be fixed to a main module in a simple manner, also in an automated manner via gripping systems or robots, respectively. In order for a dissimilar type of motor vehicle to be produced, the docking plate of the device may therefore be changed in a simple and in particular automated manner such that new, matching receptacles are also provided for the new motor vehicle parts.

Apart from a docking plate being interchanged in an automated manner, a docking plate may also be configured to be manually interchanged, for example, by lifting the docking plate by a manually controlled manipulator or lifting apparatus, respectively.

In accordance with embodiments, the docking plate is fixed, or configured to be fixed, respectively, in a positionally accurate manner and/or to be accurate in terms of tolerances in the main module.

In accordance with embodiments, the docking plate comprises bolts, in particular, retractable clamping bolts. The docking plate is fixed via the bolts in a positionally accurate manner in the main module. The docking plate particularly comprises two or four bolts, or retractable clamping bolts, respectively, which are configured to be attached in the region of the corners of a quadrangular docking plate. The bolts in the use state are configured on the lower side of the docking plate and preferably project in a vertically downward manner.

In accordance with embodiments, the main module comprises one or more clamping device, particularly, a zero-point clamping device and/or a locking installation, which is configured for the clamping bolts, in particular, the retractable clamping bolts, and/or otherwise for fixing and/or locking the docking plate on the main module. The main module forms a so-called zero-point clamping system and/or a zero-point locking system for receiving a docking plate in a positionally accurate manner and/or to be accurate in terms of tolerances.

In accordance with embodiments, the main module, which is fixedly assembled on a main frame and which has one or a plurality of zero-point clamping devices and one or more docking plate which is configured to be replaced or released, respectively, on the main module, may conjointly form a "docking module."

In accordance with embodiments, the main module comprises a media interface. A medium, in particular, compressed air and/or electric signals and/or electric current, is configured to be supplied to the main module by way of the media interface. The compressed air may serve to lock the retractable clamping bolts located on the docking plate on the main module, in particular, on the zero-point system. The transmission of electric current and/or electric signals to the main module may also take place in an inductive manner.

In accordance with embodiments, the receptacles comprise bearing faces, consoles, and/or tensioners. The receptacles may, in particular, be configured to be specific to a type of motor vehicle. The receptacles may be configured as separate components for fastening to the docking plate, in particular, to be releasably connected in order to be released and replaced.

In accordance with embodiments, the docking plate comprises holding elements, for example bolts, tensioning bolts, or similar elements which are configured such that the docking plate via a gripping system that engages on the holding elements is to be positioned on the main module and/or is to be removed from the main module.

In accordance with embodiments, the device comprises one or more gripping system, in particular, a robot, wherein the gripping system is configured for positioning the docking plate on the main module and/or for removing said docking plate from the main module. The docking plate by the gripping system, in particular, the robot, is preferably fetched from a storage frame in order to be attached to the main module, and upon removal from the main module is deposited in a storage frame by the gripping system.

In accordance with embodiments, the device comprises one or more additional docking plate which is configured to be interchanged in an automated manner. The additional docking plate is configured to be fixed to a positionally accurate manner in the same main module in which the docking plate is configured to be fixed. Additional receptacles are configured on the additional docking plate, and the additional receptacles of the additional docking plate are configured to be dissimilar to the receptacles of the docking plate. Two docking plates of dissimilar configurations are thus configured to be fixed to one main module. The dissimilar docking plates may be used for producing dissimilar types of vehicles. The main frame and the main modules do not have to be replaced to this end.

In accordance with embodiments, the device comprises at least two, or at least three main modules, and at least two, or at least three docking plates which are configured to be interchanged in an automated manner. The docking plates are configured to be fixed or are fixed to a positionally accurate manner in a respective main module, and receptacles are disposed on each docking plate. A plurality of main modules for simultaneously fixing a plurality of docking plates may thus be configured in one main frame.

In accordance with embodiments, a method for selectively configuring a device as described herein for positioning motor vehicle parts for producing motor vehicles of a first type and for producing motor vehicles of a second type may comprise: equipping, in an automated manner, a main module for producing motor vehicles of the first type of motor vehicle with a first docking plate, wherein receptacles, which are configured for holding motor vehicle parts of the motor vehicle of the first type, are configured on the first docking plate; and equipping, in an automated manner, the main module for producing motor vehicles of the second type with a second docking plate, wherein additional receptacles which are configured for holding motor vehicle parts of the motor vehicle of the second type are configured on the second docking plate.

In accordance with embodiments, in order for the device to be reconfigured for producing another type of motor vehicle, the main frame and the main modules may therefore continue to be used, and only the clamped docking plates having their receptacles thereof which are specific to the vehicle type are to be interchanged.

DRAWINGS

Embodiments will be illustrated by way of example in the drawings and explained in the description below.

DESCRIPTION

Figure 1:
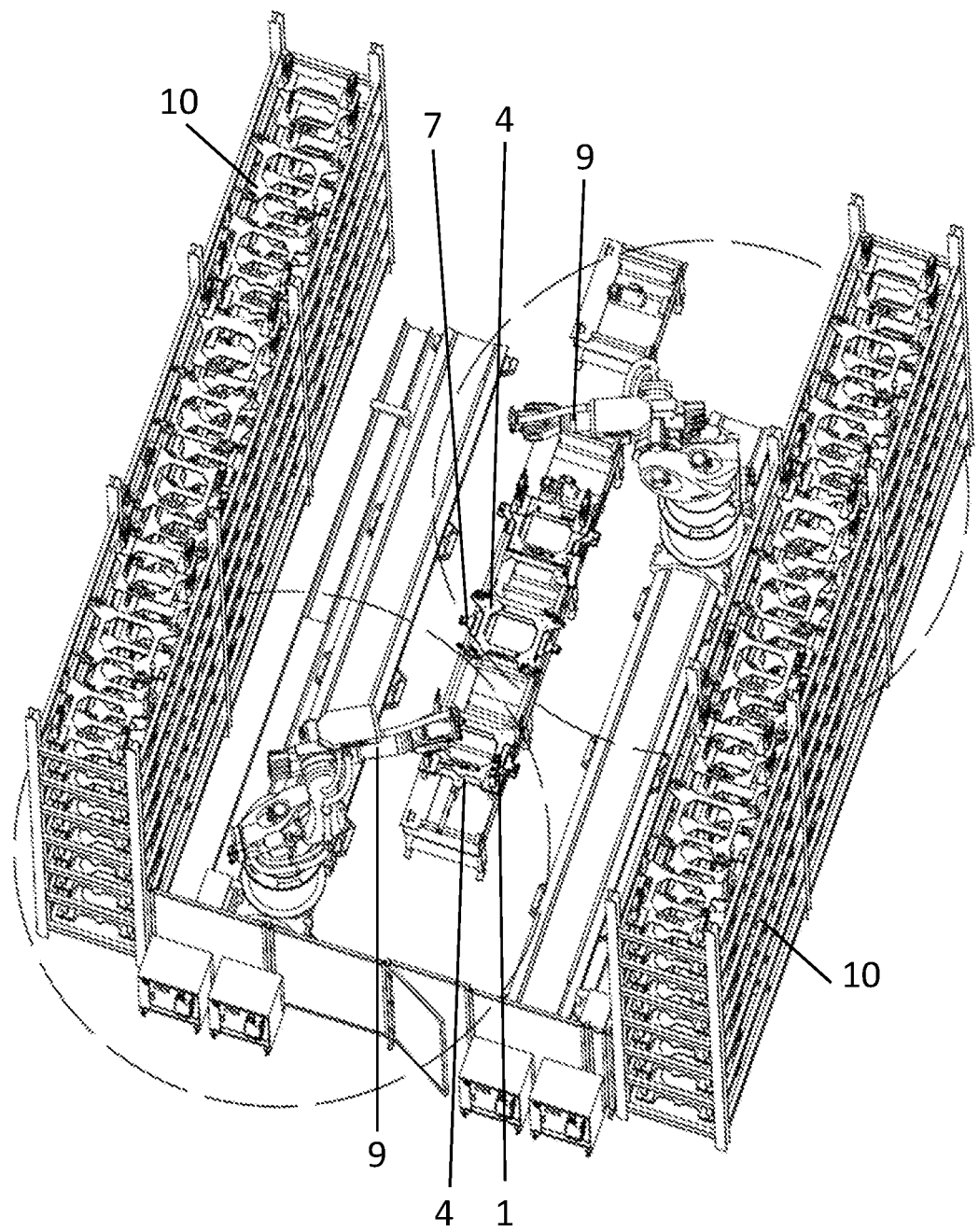
FIG. 1 illustrates a three-dimensional view of a device for positioning a motor vehicle part, in accordance with embodiments.

In accordance with embodiments, FIG. 1 illustrates a device for positioning motor vehicle parts for producing motor vehicles. The motor vehicle parts, for further processing, in particular, for equipping with additional components of the motor vehicle to be produced, may be positioned on docking plates 4.

Figure 2:
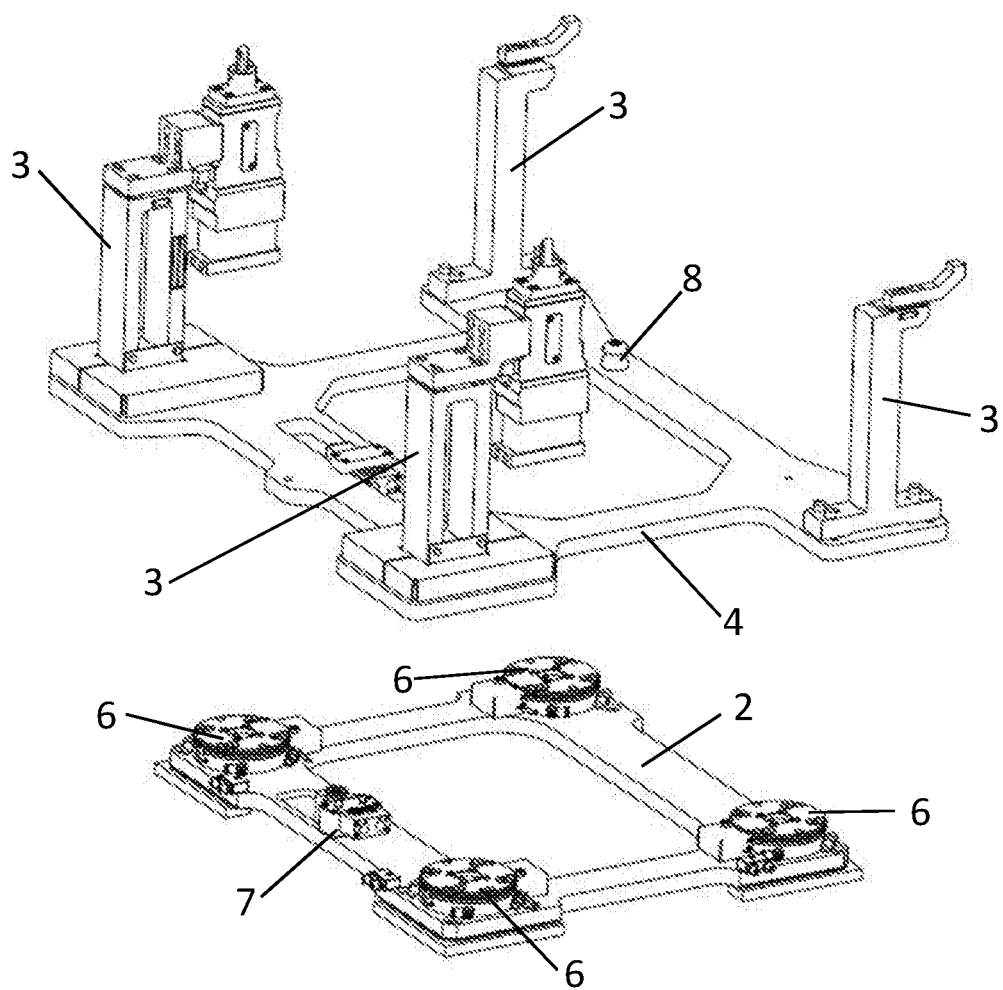
FIG. 2 illustrates a three-dimensional top view of a main module and a docking plate of the device of FIG. 1.

As illustrated in FIG. 2, a plurality of docking plates 4 may be received on main modules 2 on one common main frame 1. The main modules 2 and the docking plates 4 have a flat shape. When viewed from above, the main modules 2 and the docking plates 4 have a rectangular or square shape or cross-section. In particular, the main modules 2 and the docking plates 4 may form a substantially rectangular or square frame such that the frame of a docking plate 4 substantially fits onto the frame of a main module 2.

The docking plates 4 are kept ready in a storage frame 10, for example, at the side of the main frame 1, and may be removed from the space of the docking plates 4 in the storage frame 10 by gripping systems 9, in particular, on robots, and be positioned on the main modules 2 so as to provide suitable receptacles 3 (illustrated in FIG. 2) for producing a specific type of vehicle.

The device thus comprises a main frame 1, a plurality of main modules 2 which are disposed on the main frame 1, and a plurality of docking plates 4 which are configured to be interchanged in an automated manner. The docking plates 4 may be fixed to a positionally accurate manner in the main modules 2. All main modules 2 and all docking plates 4 may have identical dimensions such that the docking plates 4 may be fixed to an arbitrary manner on all main modules 2.

As is illustrated in FIG. 2, a plurality of receptacles 3 (in the illustrated example, four) are in each case arranged on the docking plates 4 to hold, via the receptacle 3, motor vehicle parts at a predefined position. The receptacles 3 may comprise bearing faces, consoles, and/or tensioners and/or retractable/deployable positioning pins.

Figure 3:
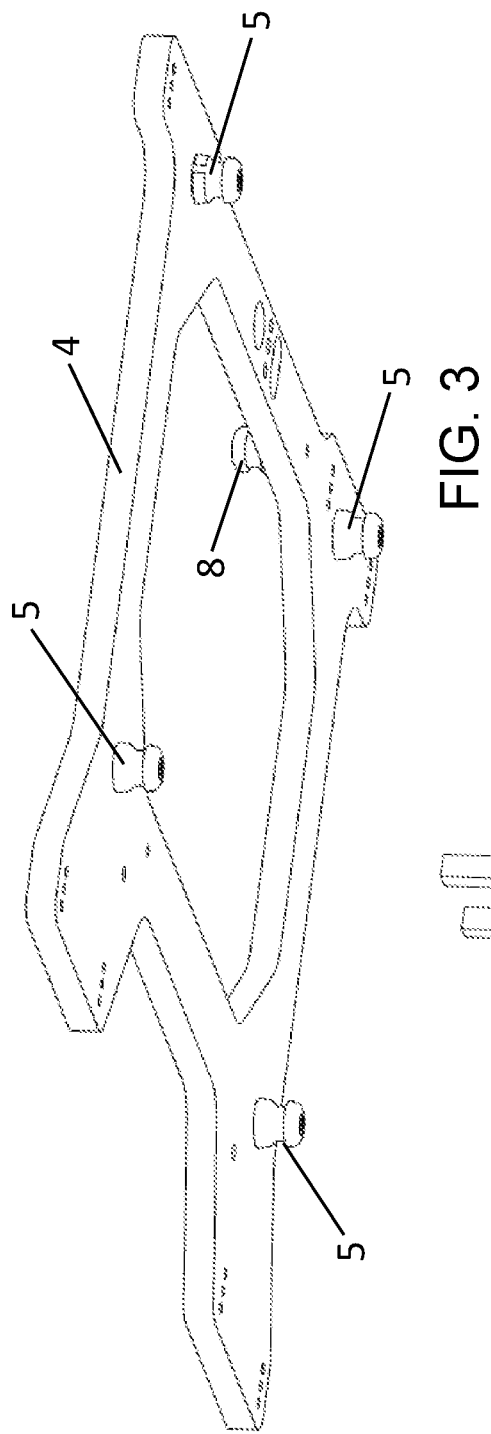
FIG. 3 illustrates a three-dimensional bottom view of the docking plate of the device, without receptacles.
Figure 4:
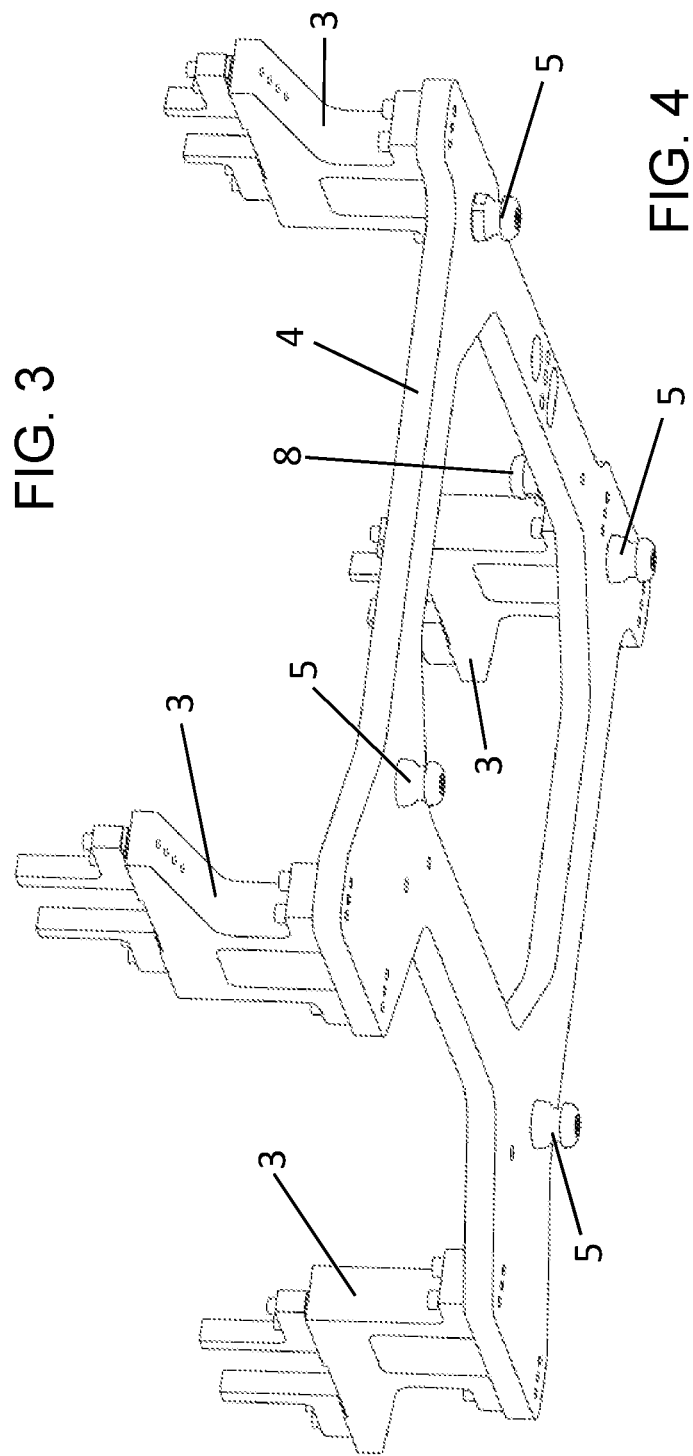
FIG. 4 illustrates a three-dimensional bottom view of the docking plate of the device, with receptacles.

As is illustrated in FIGS. 3 and 4, each docking plate 4, on a lower side thereof, has a plurality of bolts 5 (in the illustrated example, four) that comprise retractable clamping bolts, to fix the docking plate 4 in a positionally accurate manner in a main module 2.

As is illustrated in FIG. 2, the main module 2 may have a plurality of correspondingly positioned clamping devices 6, in particular, zero-point clamping devices, which are configured to clamp the retractable clamping bolts 5 in a docking plate 4. In this way, the main module 2 forms a zero-point clamping system.

In accordance with embodiments, the main module 2 may comprise a media interface 7 to facilitate supply of a medium, such as, for example, one or more of compressed air, electric signals, and electric current, to the main module 2 by way of the media interface 7. For example, the compressed air, via clamping devices 6, such as, for example, zero-point clamping devices, may serve to lock the retractable clamping bolts 5 located on the docking plate 4 on the zero-point system, or on the main module 2, respectively.

Each docking plate 4 also comprises a plurality of holding elements 8, for example, bolts, clamping bolts, or the like, disposed on an upper side of the docking plates 4. The holding elements 8 are configured such that the docking plates 4 via a gripping system 9 (FIG. 1) that engages the holding element 8, are to be positioned on the main module 2 and/or be removed from the main module 2.

In order for the device to selectively position motor vehicle parts for producing motor vehicles of a first type, the main module 2, via the gripping system 9, is equipped in an automated manner with a first docking plate 4. The first receptacles 3 arranged on the first docking plates 4 are configured to hold the motor vehicle parts of the motor vehicle of the first type.

In order for the device to selectively position motor vehicle parts for producing motor vehicles of a second type, the main module 2, via the gripping system 9, is equipped in an automated manner with a second docking plate 4. The second receptacles 3 arranged on the second docking plates 4 are configured to hold the motor vehicle parts of the motor vehicle of the first type. Accordingly, the second receptacles 3, at least in part, are dissimilar to the first receptacles 3 such that only other motor vehicle parts may be positioned, or motor vehicle parts may be positioned in a different manner, respectively, to thereby produce another type of motor vehicle.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Main frame
2 Main module
3 Receptacle
4 Docking plate
5 Bolt
6 Clamping device
7 Media interface
8 Holding element
9 Gripping system
10 Storage frame

What is claimed is:

1. A device for selectively positioning motor vehicle parts during a production of a motor vehicle, the device comprising:
   a main frame;
   at least one main module configured to be disposed on the main frame, the at least one main module including a zero-point clamping device;
   at least one first interchangeable docking plate configured for releasable connection in a positionally accurate manner to the at least one main module and to be interchanged in an automated manner, the at least one first interchangeable docking plate including a retractable clamping bolt to facilitate the releasable connection of the at least one first interchangeable docking plate to the at least one main module in the positionally accurate manner, the retractable clamping bolt being lockingly received by the zero-point clamping device;
   a plurality of first receptacles, arranged on the at least one first interchangeable docking plate, configured to hold the motor vehicle parts at a predefined position;
   at least one second interchangeable docking plate configured to be interchanged in an automated manner, and which is releasably connected to the main module in the positionally accurate manner; and
   a plurality of second receptacles, arranged on the at least one second interchangeable docking plate and which are dissimilar to the first receptacles, configured to hold the motor vehicle parts at the predefined position.

2. The device of claim 1, further comprising a media interface arranged on the main module to send a medium to the at least one main module, wherein the medium comprises compressed air and/or electric signals and/or electric current.

3. The device of claim 1, wherein each first receptacle in the plurality of first receptacles comprises a bearing face, a console, and/or a tensioner.

4. The device of claim 1, wherein the at least one first interchangeable docking plate comprises at least one holding element configured to be engaged by a gripping system to thereby position the at least one first interchangeable docking plate on the at least one main module and/or remove the first interchangeable docking plate from the main module.

5. The device of claim 1, further comprising at least one gripping system configured to position the at least one first interchangeable docking plate on the at least one main module and/or configured to remove the at least one first interchangeable docking plate from the at least one main module.

6. A device for selectively positioning motor vehicle parts during a production of a motor vehicle, the device comprising:
   a main frame;
   a plurality of main modules configured to be disposed on the main frame, each main module in the plurality of main modules including a zero-point clamping device;
   a plurality of first interchangeable docking plates, each first interchangeable docking plate in the plurality of first interchangeable docking plates being configured for releasable connection in a positionally accurate manner to one main module in the plurality of main modules, and to be interchanged in an automated manner, each first interchangeable docking plate in the plurality of first interchangeable docking plates including a retractable clamping bolt to facilitate the releasable connection of the first interchangeable docking plate to one main module in the plurality of main modules in the positionally accurate manner, and each main module in the plurality of main modules including a zero-point clamping device configured to lockingly receive a retractable clamping bolt of a corresponding first interchangeable docking plate;

a plurality of first receptacles, arranged on a corresponding one of the first interchangeable docking plates, configured to hold the motor vehicle parts at a predefined position;

a plurality of second interchangeable docking plates, each second interchangeable docking plate in the plurality of interchangeable second docking plates being configured to be interchanged in an automated manner, and releasably connected to a corresponding main module in the positionally accurate manner; and a plurality of second receptacles, arranged on the at least one second interchangeable docking plate and which are dissimilar to the first receptacles, configured to hold the motor vehicle parts at the predefined position.

7. The device of claim 6, further comprising a media interface arranged on at least one main module in the plurality of main modules to send a medium to the main module, wherein the medium comprises compressed air and/or electric signals and/or electric current.

8. The device of claim 6, wherein each first receptacle in the plurality of first receptacles comprises a bearing face, a console, and/or a tensioner.

9. The device of claim 6, wherein each first interchangeable docking plate in the plurality of interchangeable docking plates comprises at least one holding element configured to be engaged by a gripping system to thereby position the first interchangeable docking plate on a corresponding main module and/or remove the first interchangeable docking plate from the corresponding main module.

10. The device of claim 6, further comprising at least one gripping system configured to position a corresponding first interchangeable docking plate on a corresponding main module and/or for remove the corresponding first interchangeable docking plate from the corresponding main module.

\* \* \* \* \*